June 10, 1969  C. R. OAK  3,448,872
FUEL ELEMENT POSITIONER

Filed Jan. 18, 1968  Sheet 1 of 3

Inventor
Cecil R. Oak
By:
Roland A. Anderson
Attorney

Inventor
Cecil R. Oak
By:
Roland A. Anderson
Attorney

June 10, 1969 C. R. OAK 3,448,872
FUEL ELEMENT POSITIONER
Filed Jan. 18, 1968 Sheet 3 of 3
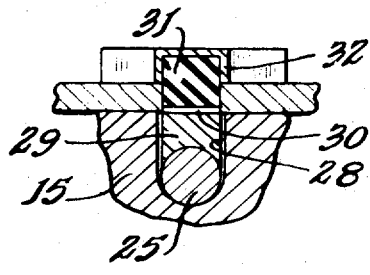
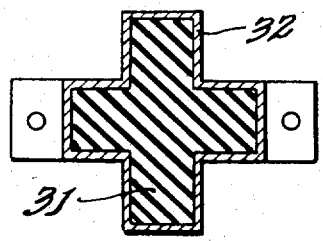
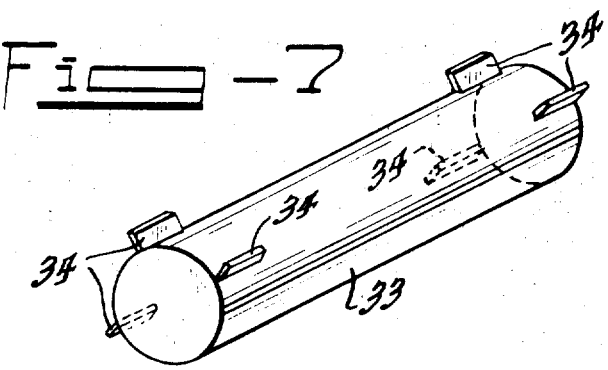
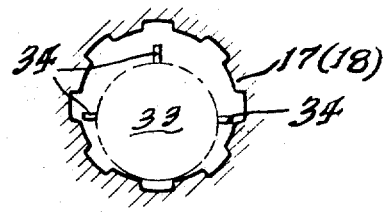
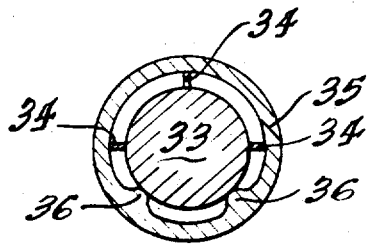
Inventor
Cecil R. Oak
By:
Roland A. Anderson
Attorney

United States Patent Office 3,448,872
Patented June 10, 1969

3,448,872
FUEL ELEMENT POSITIONER
Cecil R. Oak, San Jose, Calif., assignor to the United States of America as represented by the United States Atomic Energy Commission
Filed Jan. 18, 1968, Ser. No. 698,930
Int. Cl. G21c 19/10
U.S. Cl. 214—23           3 Claims

ABSTRACT OF THE DISCLOSURE

Apparatus for orienting a ribbed fuel element being inserted in a nuclear reactor. Internally grooved rotators rotate a fuel element having at each end three ribs spaced 90° from one another so that the fuel element enters the reactor with its ribs at the positions of 9 o'clock, 12 o'clock and 3 o'clock.

*Contractual origin of the invention*

The invention described herein was made in the course of, or under, a contract with the United States Atomic Energy Commission.

*Background of the invention*

This invention relates to orienting fuel elements in a process tube of a nuclear reactor.

Certain nuclear reactors have horizontal process tubes and fuel elements, each provided with ribs locating the fuel elements in the tubes so that space is provided between the fuel elements and the tubes for the flow of coolant. For example, the tube may have two ribs at its lower side in the positions of between 4 and 5 o'clock and between 7 and 8 o'clock. In this event, the fuel element may have two sets of three ribs at or near its ends, the ribs of each set being spaced 90° from one another and located in the 9, 12 and 3 o'clock positions, so that annular space for cooling water is maintained completely around the fuel element, and cocking of the fuel element to one side or the other or to the top of the tube is avoided, with the result that there is an even flow of cooling water around the fuel element.

I have invented an apparatus that will assure that the ribs of the fuel elements are in the 9, 12 and 3 o'clock positions when the fuel elements enter their process tubes.

*Brief description of the drawings*

In the drawings:

FIG. 5 is a fragmentary longitudinal sectional view taken on the line 5—5 of FIG. 3;

FIG. 6 is a fragmentary horizontal sectional view taken on the line 6—6 of FIG. 3;

FIG. 7 is a perspective view of a fuel element oriented by the present apparatus;

FIG. 8 is a fragmentary transverse sectional view showing the fuel element as positioned in a nuclear reactor; and FIG. 9 is a fragmentary transverse sectional view of the fuel element as oriented by the present apparatus.

*Description of the preferred embodiment*

Figure 1:
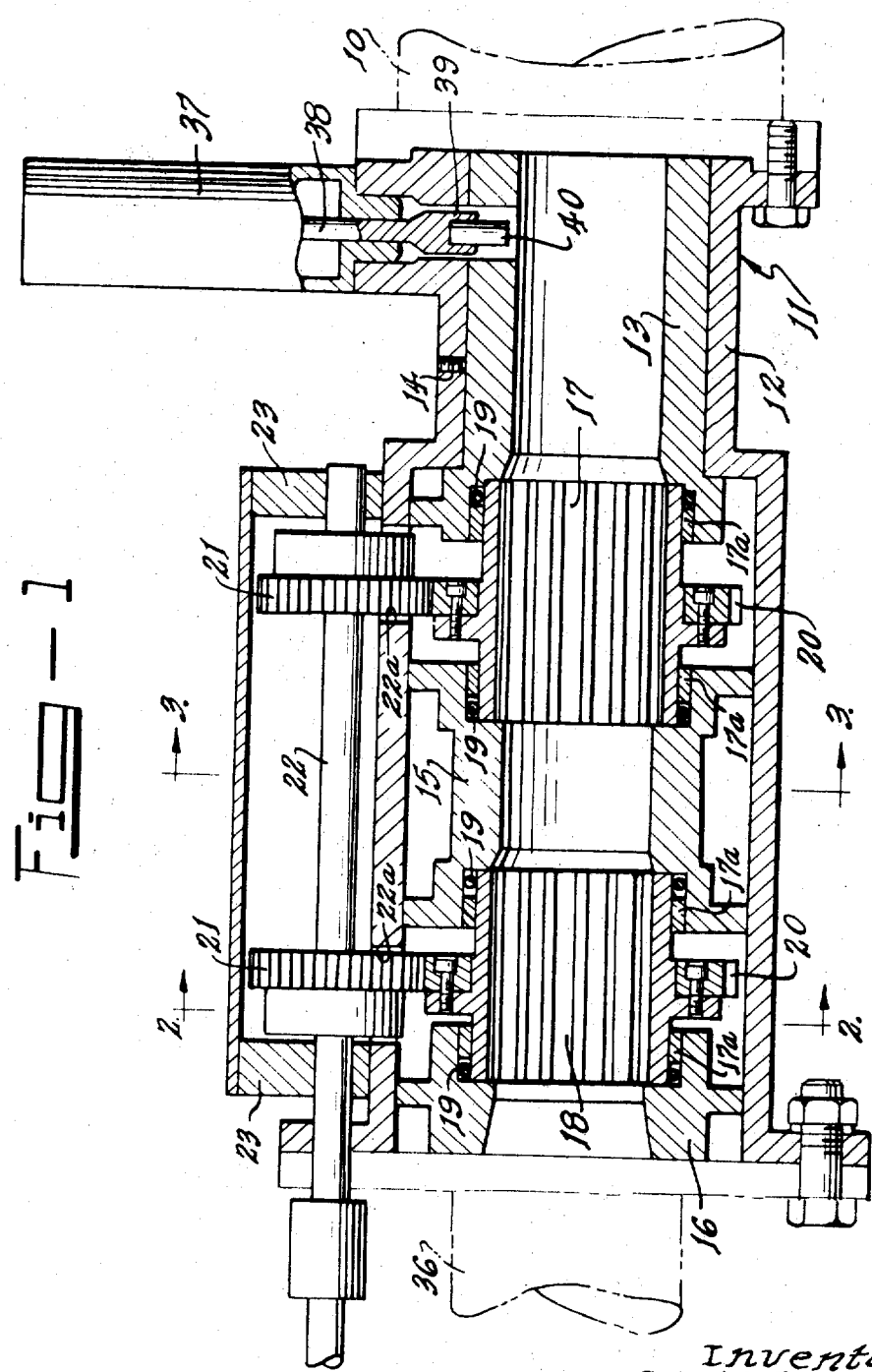
FIG. 1 is a longitudinal sectional view of the apparatus of FIG. 1 taken on the line 1—1 of FIG. 2.

As shown in FIG. 1, the reference character 10 designates a coupler on the exterior of a nuclear reactor. A tubular housing 11 is secured to the coupler 10 and carries in a reduced portion 12 adjacent the coupler 10, a tubular insert 13, fixed by a set screw 14. The housing 11 also fixedly carries a tubular insert 15 between its ends and a tubular insert 16 at the end remote from the coupler 10.

Figure 2:
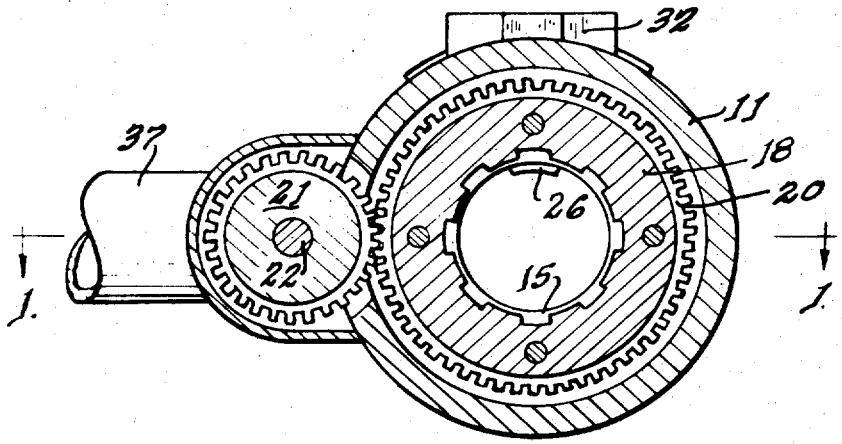
FIG. 2 is a transverse sectional view taken on the line 2—2 of FIG. 1.

A rotator 17 is journaled on bearings 17a in the tubular inserts 13 and 15. A rotator 18 is journaled on bearings 17a in the tubular inserts 15 and 16 in spaced, axially aligned relationship to the rotator 17. Sealing is provided between the rotators 17 and 18 and the tubular inserts 13, 15, and 16 by neoprene O-rings 19. The rotators 17 and 18 have longitudinal grooves distributed entirely about their interiors, as shown in FIGS. 1 and 2. The grooves of rotator 17 are aligned with those of rotator 18.

As shown in FIG. 1, external ring gears 20 are secured to the exterior of the rotators 17 and 18 and mesh with pinions 21. The pinions 21 extend through openings 22a in the housing 11 into engagement with the ring gears 20 and are mounted on and secured to a rotatable drive shaft 22. The shaft 22 extends along the outside of the housing 11 and is journaled in blocks 23 fixed to the housing 11.

Figure 3:
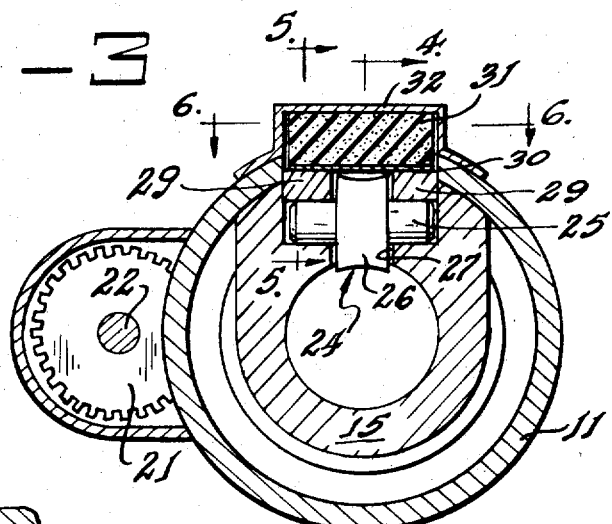
FIG. 3 is a transverse sectional view taken on the line 3—3 of FIG. 1.
Figure 4:
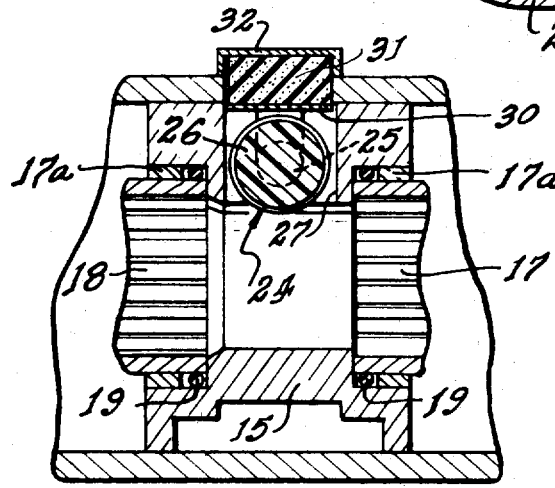
FIG. 4 is a fragmentary transverse sectional view taken on the line 4—4 of FIG. 3.

As shown in FIGS. 3 and 4, a neoprene roller 24 is provided, which has reduced bearing portions 25 at its ends and a body portion 26 having an arcuate depressed surface. The body portion 26 of the roller 24 is located in a slot 27 in the tubular insert 15. As shown in FIG. 5, the bearing portions 25 are journaled in arcuate grooves 28 formed in the tubular insert 15. As shown in FIGS. 3 and 5, the roller 24 is held down by blocks 29 which have arcuate grooves on their lower sides engaging the bearing portions 25 of the roller 24. The blocks 29 are held against the bearing portions 25 by a plate 30, a rubber member 31, and a cover 32. The plate 30 engages the blocks 29 and is engaged by the rubber member 31. The cover 32 is fastened to the tubular housing 11 and retains the rubber member 31 in place. As shown in FIG. 6, the rubber member 31 is cruciform. The plate 30 and cover 31 are similarly shaped. The effect of the blocks 29, plate 30, rubber member 31, and cover 32 is to keep the roller 24 down so that the body portion 26 thereof protrudes into the tubular insert 15, as shown in FIG. 3, and yet to allow the roller 24 to be pushed upward against the action of the rubber member 31.

As shown in FIG. 7, a fuel element 33, which is to be oriented by the apparatus of the present invention, has adjacent each end a set of three longitudinal ribs 34 spaced 90° from one another, the ribs of one set being aligned with those of the other set. As shown in FIG. 8, the fuel element 33 is received in a reactor process tube 35 so as to rest on internal longitudinal ribs 36 of the tube, which ribs are in the positions of between 4 and 5 o'clock and between 7 and 8 o'clock. Thus, it is desirable that the ribs 34 of the fuel element 33 be at the 9, 12 and 3 o'clock positions as shown so as to be spaced from the tube ribs 36. Consequently, annular space for cooling water is maintained completely around the fuel element 33, and cocking of the fuel element to the one side or the other or to the top of the tube 35 is avoided, with the result that there is an even flow of cooling water around the fuel element 33.

When the fuel element 33 is located in the apparatus of the present invention with the ends of the fuel elements in the rotators 17 and 18 so that the ribs 34 on the fuel element can engage the grooves in the rotators, rotation of the rotators will cause the fuel element to rotate until the ribs thereon reach positions of 9 o'clock, 12 o'clock and 3 o'clock. In these positions, all the ribs 34 will be out of engagement with the grooves in the rotators, as shown in FIG. 9. When the fuel element 33 is oriented so that its ribs 34 are not in the 9 o'clock, 12 o'clock and 3 o'clock positions, at least one rib 34 will be between 3 o'clock and 9 o'clock on the lower side of the fuel element. Thus, since the pressure of roller 24 keeps the fuel element 33 on the bottom of the rotators 17 and 18, there will be engagement between at least one rib 34 and the grooves in the rotators. When the ribs 34 reach 9 o'clock, 12 o'clock and 3 o'clock, no rib will engage a groove in the rotator, since no rib is on the lower side of the fuel element.

The process tube 35 will be aligned in a manner not shown with the coupler 10, shown in FIG. 1, so that the apparatus of the present invention may orient the ribs 34 to 9 o'clock, 12 o'clock and 3 o'clock as the fuel element 33 is fed into the process tube 35.

The fuel elements 33 are fed longitudinally one by one to the right as viewed in FIG. 1 into the apparatus of the present invention by a charging mechanism 36 secured to the left end of the tubular housing 11. When the fuel element 33 is positioned in the present apparatus so that its ribs 34 lie in the rotators 17 and 18, the rotators are rotated 360° by the gears 20 and 21 and the shaft 22. Regardless of the orientation of the fuel element 33 on entering the rotators 17 and 18, the ribs 34 of the fuel element will be brought to 9 o'clock, 12 o'clock and 3 o'clock by a rotation of the rotators 17 and 18 through 360°. Appreciably less than 360° of rotation may be required for orientation, but this does not matter, for once the ribs reach the required positions, they are no longer engaged by the grooves in the rotators, and further rotation of the rotators is without effect on the fuel element.

The purpose of the roller 24 is to apply pressure to the fuel element 33 and to keep the ribs 34 engaged in the grooves in the rotators 17 and 18 while the fuel element is being oriented by being rotated by the rotators 17 and 18. Thus, as shown in FIG. 3, the body portion 26 of the roller 24 protrudes into the tubular insert 15 and so is enabled to hold the fuel element down. Since the fuel element 33 is held down, any rib 34 thereof at or near the 12 o'clock position will not engage a groove in the actuator 17 or 18 and so will not cause rotation of the fuel element at a time when such rotation should not occur because there is no rib at the 6 o'clock position.

In spite of the fact that the roller 24 protrudes into the interior of the tubular insert 15, as shown in FIG. 3, the roller does not interfere with the feeding of the fuel element 33 with one rib 34 in the 12 o'clock position, through the apparatus of the present invention, for, when the rib engages the roller 24, the roller yields upwardly because of the rubber member 31.

The charging mechanism 36 may include a piston for moving the fuel element 33 to be oriented into the rotators 17 and 18. Rotation of the shaft 22 for orientation of the fuel element 33 is advantageously performed during the return stroke of the charging piston. Such rotation at this time in the operation may be carried out by a long lead screw and a ratchet nut actuating the same and fastened to the piston rod of the charging piston.

The return stroke of the charging piston may also be used to hold against rotation of the fuel element 33 directly ahead of the fuel element being oriented by the rotators 17 and 18. For this purpose, there are provided an air cylinder 37, a piston rod 38 operating therein, a sleeve 39 on the end of the piston rod, and a neoprene rubber tip 40 on the sleeve. The air cylinder 37 may be actuated on the return stroke of the charging piston of the charging mechanism 36 to act through the piston rod 38 and the sleeve 39 to apply the neoprene rubber tip 40 against the fuel element ahead of the fuel element being oriented.

It will be understood that the invention is not to be limited by the details given herein but that it may be modified.

The embodiments of the invention in which an exclusive property or privilege is claimed are defined as follows:

1. Apparatus for orienting a fuel element about to be fed into a process tube of a reactor so that six external ribs that are in two groups located near the ends of the fuel element, each group being composed of three ribs spaced 90° from one another about the fuel element, the ribs of one group being aligned with the ribs of the other group, are at the 9, 12 and 3 o'clock positions and no ribs are at the 6 o'clock position, said apparatus comprising two axially aligned and axially spaced rotators loosely receiving the end portions of the fuel element and being grooved entirely about their interiors so as to be capable of meshing with the ribs of the fuel element.

2. The apparatus specified in claim 1 and further comprising two ring gears attached to the outside of the rotators, two pinions meshing with the ring gears, and a drive shaft mounting and secured to the pinions, whereby rotation of the drive shaft is transmitted through the pinions and the ring gears to the rotators.

3. The apparatus specified in claim 2 and further comprising means for preventing the fuel element from bouncing while being rotated by the rotators, said means comprising a roller having an arcuate depressed body portion and reduced end portions, arcuate blocks engaging the end portions to hold them down, and a rubber member for resiliently holding the blocks against the end portions of the rollers.

References Cited

UNITED STATES PATENTS 2,725,993  12/1955  Smith _____ 214—23
3,169,647  2/1965  Hummel _____ 214—23

ROBERT G. SHERIDAN, *Primary Examiner.*

U.S. Cl. X.R.

176—30; 214—1